(12) United States Patent
Crabtree et al.

(10) Patent No.: US 10,210,255 B2
(45) Date of Patent: Feb. 19, 2019

(54) DISTRIBUTED SYSTEM FOR LARGE VOLUME DEEP WEB DATA EXTRACTION

(71) Applicant: Fractal Industries, Inc., Reston, VA (US)

(72) Inventors: Jason Crabtree, Vienna, VA (US); Andrew Sellers, Monument, CO (US)

(73) Assignee: Fractal Industries, Inc., Reston, VA (US)

( * ) Notice: Subject to any disclaimer, the term of this patent is extended or adjusted under 35 U.S.C. 154(b) by 285 days.

(21) Appl. No.: 14/986,536

(22) Filed: Dec. 31, 2015

(65) Prior Publication Data

US 2017/0193110 A1    Jul. 6, 2017

(51) Int. Cl.
*G06F 17/30*    (2006.01)
*G06Q 10/06*    (2012.01)
*H04L 29/08*    (2006.01)

(52) U.S. Cl.
CPC .. *G06F 17/30864* (2013.01); *G06F 17/30887* (2013.01); *H04L 67/02* (2013.01)

(58) Field of Classification Search
CPC ......... G06F 17/30864; G06F 17/30887; H04L 67/02
USPC ...................................................... 707/709
See application file for complete search history.

(56) References Cited

U.S. PATENT DOCUMENTS

| | | | |
|---|---|---|---|
| 7,139,747 B1* | 11/2006 | Najork | G06F 17/30864 |
| 9,400,962 B2* | 7/2016 | Prasad | G06F 17/30607 |
| 2005/0071766 A1* | 3/2005 | Brill | G06F 17/30864 |
| | | | 715/738 |
| 2005/0192936 A1* | 9/2005 | Meek | G06F 17/30864 |
| 2011/0307467 A1* | 12/2011 | Severance | H04L 67/1095 |
| | | | 707/709 |
| 2013/0218840 A1 | 8/2013 | Smith et al. | |
| 2013/0304761 A1 | 11/2013 | Redlich et al. | |
| 2013/0332460 A1 | 12/2013 | Pappas et al. | |
| 2015/0161257 A1* | 6/2015 | Shivaswamy | H04N 7/16 |
| | | | 707/709 |

FOREIGN PATENT DOCUMENTS

WO        2015089463 A1    6/2015

* cited by examiner

*Primary Examiner* — Hosain T Alam
*Assistant Examiner* — Robert F May
(74) *Attorney, Agent, or Firm* — Brian R. Galvin; Galvin Patent Law LLC

(57) ABSTRACT

A distributed system for large volume deep web data extraction that is extremely scalable, allows multiple heterogeneous concurrent searches, has power web scrape result processing capabilities and uses a well defined, highly customizable, simplified, search agent configuration interface requiring minimal specialized programming knowledge. A scrape campaign control module receives scrape control and web spider configuration parameters through either a command line interface of an HTTP based application programming interface. The control module uses those parameters to have an arbitrary plurality of web spiders created and deployed by a plurality of servers. Scrape campaign results are presented as prescribed.

3 Claims, 8 Drawing Sheets

```
import scrapy
from scrapy.spiders import CrawlSpider, Rule           } ~ 810
from scrapy.linkextractors import LinkExtractor class MySpider(CrawlSpider):
    name = 'example.com'
    allowed_domains = ['example.com']                   } ~ 820
    start_urls = ['http://www.example.com']
                                                                                830 ~
    rules = (
        # Extract links matching 'category.php' (but not matching 'subsection.php')
        # and follow links from them (since no callback means follow=True by default).
        Rule(LinkExtractor(allow=('category\.php', ), deny=('subsection\.php', ))),
        # Extract links matching 'item.php' and parse them with the spider's method parse_item
        Rule(LinkExtractor(allow=('item\.php', )), callback='parse_item'),
    )

def parse_item(self, response):
        self.logger.info('Hi, this is an item page! %s', response.url)
        item = scrapy.Item()
        item['id'] = response.xpath('//td[@id="item_id"]/text()').re(r'ID: (\d+)')
        item['name'] = response.xpath('//td[@id="item_name"]/text()').extract()
        item['description'] = response.xpath('//td[@id="item_description"]/text()').extract()
        return item
                                                                                840
```

Figure 8

_DISTRIBUTED SYSTEM FOR LARGE VOLUME DEEP WEB DATA EXTRACTION_

CROSS-REFERENCE TO RELATED APPLICATIONS

None.

BACKGROUND OF THE INVENTION

Field of the Invention

The present invention is in the field of retrieval and analysis of large volumes of unstructured or poorly structured World Wide Web data that has, to date, not been meaningfully extracted by current web crawling technology by using a distributed computational web scraping model that possesses the ability to coordinate a large plurality of World Wide Web scrape agents distributed over a plurality of commodity servers.

Discussion of the State of the Art

The ability to transfer information between individuals, even over large distances, is credited with allowing mankind to rise from a species of primate gatherer-scavengers to form simple communities. The ability to stably record information so that it could be analyzed for the presence of repetitive events, trends, and to serve as a base to be expanded and built upon was another substantial advance in the art. It is safe to say that the availability of information in formats that allow it to be analyzed and added to by both individuals contemporary to its accrual and those who come after is an extremely powerful tool available to mankind and likely is what has propelled us to the level of social and technological achievement we have attained.

Nothing has augmented our ability to gather and store information analogous to the rise of electronic and computer technology. There are sensors of all types to measure just about any condition one can imagine. Computers have allowed the health information for a large portion of the human population to be stored and accessible. Similarly, mass quantities of detailed data concerning the workings of government, as well as economics, demographics, climate change, and population shifts are all being continuously stored for public analysis and made available on the World Wide Web. The meteoric rise of computer networking and the internet has only served to turn the accrual of information into a torrent as now huge populations can exchange observations, data and ideas, are even invited to do so; vast arrays of sensors can be tied together in meaningful ways all generating data which can be stored for future analysis and use. The receipt and storage of data has gotten to the point where an expert has been quoted as estimating that as much data is currently accrued in two days as was accrued in all history prior to 2003 (Eric Schmidt, Google); much of this data makes its way to the World Wide Web. Entirely new distributed data storage technologies such as map/reduce; key-value pairs, and graph and column based data store organization have been developed to accommodate the influx of information and to provide the ability to store retrieved information in a structured way, yet vast amounts of this data posted to sources available through the Web lack machine parsable descriptive tags that allow the currently available web page indexing and retrieval technologies to access and process it. At this time this data is therefore virtually invisible without the use of highly specialized, tedious, and time consuming programming methodology. Coined the "deep web", this body of data is believed to be orders of magnitude larger than the indexed, searchable, "clear" portion of the World Wide Web. Presently, we are accruing vast amounts of this type of information daily but do not have the tools to analyze all but a trickle into knowledge or informed action.

What is needed is a system to rapidly search, index, and retrieve unstructured or poorly structured data from hypertext transfer protocol type sources such as the World Wide Web that is extremely scalable, allows multiple heterogeneous concurrent searches to be conducted, and exposes a well defined, highly customizable, simplified, search agent configuration interface. This system should also allow post-search data processing capabilities as well as direct output and persistent storage facilities for retrieved information and programming interfaces to receive search directives from other software and pass retrieved data to other software for further processing.

SUMMARY OF THE INVENTION

The inventor has developed a distributed system for large volume deep web data extraction that is extremely scalable, allows multiple heterogeneous concurrent searches, has powerful web scrape result processing capabilities and uses a well defined, highly customizable, simplified, search agent configuration interface requiring minimal specialized programming knowledge.

According to a preferred embodiment of the invention, a distributed system for large volume deep web data extraction comprising a distributed scrape campaign controller module stored in a memory of and operating on a processor of a computing device, a scrape requests data store stored in a memory of and operating on a processor of a computing device, a scrape request monitor module stored in a memory of and operating on a processor of a computing device, one or more scrape servers stored in a memory of and operating on a processor of one of more computing devices, a persistence service module stored in a memory of and operating on a processor of a computing device, a persistence data store stored in a memory of and operating on a processor of a computing device and an output module stored in a memory of and operating on a processor of a computing device is disclosed. The distributed scrape campaign controller module: may receive web search configuration parameters from a plurality of possible software applications through HTTP based APIs, may also receive web search configuration parameters from either a computer terminal or a plurality of possible software applications through a command line interface, uses the scrape request data store to store both generalized search control parameters and configuration parameters specific to individual web search agents (spiders) derived from the HTTP API and command line interface directives, coordinates one or more World Wide Web searches (scrapes) using both general search control parameters and spider specific configuration data, and receives scrape progress feedback information from the request data store monitor module which may lead to issuance of further web search control parameters. The scrape request data store: receives World Wide Web search control parameters and spider specific configuration information from the distributed scrape campaign controller module, and stores scrape control parameters, spider configuration parameters, scrape status data. The request data store monitor module: monitors the web scrape status data stored for each ongoing search in the scrape request data store, processes that information as programmatically pre-determined for the search monitored, sends the processed data to the distributed scrape campaign controller as appropriate. The scrape server: hosts the independent spiders on that server, receives scrape specific control directives and spider configuration parameters from the distributed scrape campaign controller module, controls and monitors the spiders on that server, returns scrape status data from the spiders on that server to the distributed scrape campaign controller and scrape request data store, sends web page data retrieved by its spiders to the persistence service module for possible persistent data store storage and possible output. Finally, the output module: produces results in a format pre-determined by the owners of the scrape campaign.

According to another preferred embodiment of the invention, a method for large volume deep web data extraction using a distributed computer system, the method comprising the steps of: To receive World Wide Web scrape control directives and web scrape agent (spider) configuration data from a command line interface or HTTP based interface. To store the World Wide Web scrape control directives and spider configuration data in a database. To initiate and coordinate web scraping campaigns using the stored web scrape control directives and spider configuration parameters employing a plurality of independent spiders possibly distributed over a plurality of servers. To monitor the progress and health status of scrape campaigns using a set of predetermined programmatic criteria making either preprogrammed or manual modifications to parameters of the campaign as desired for optimal operation. To aggregate and possibly transform scrape data retrieved by the independent spiders per design of the scrape campaign. Finally, output scrape campaign status and result information in formats pre-decided during design of the campaign, optionally storing that result information in a data store.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 4:
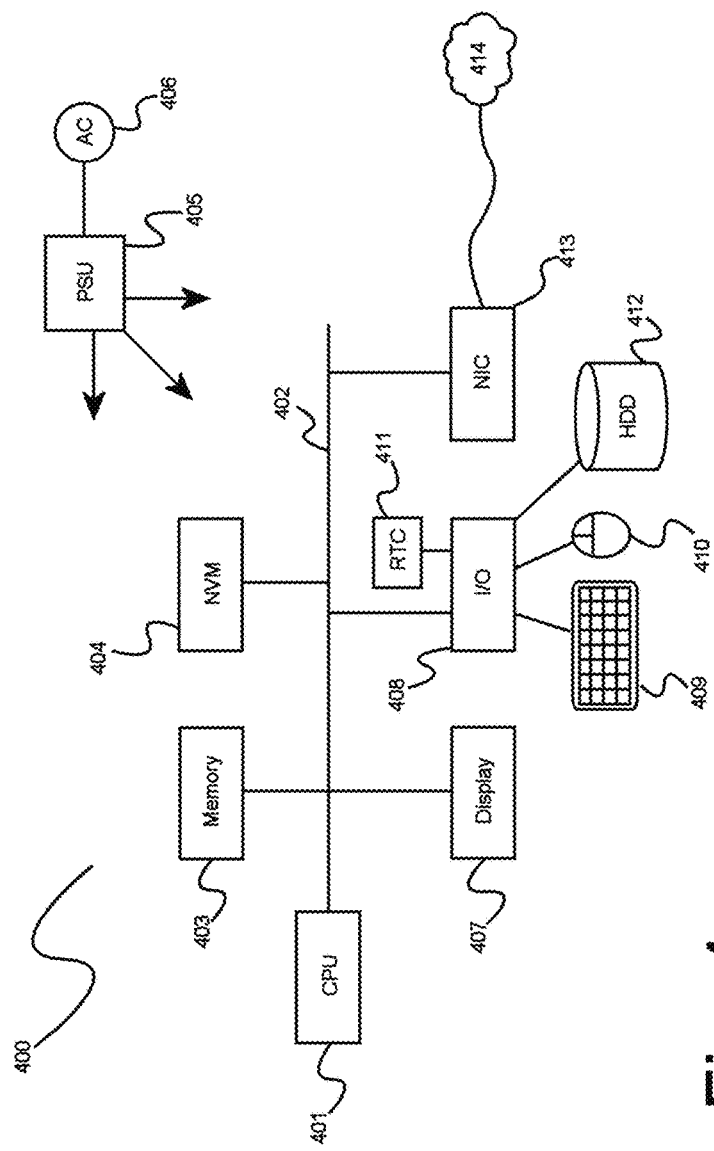
Figure 5:
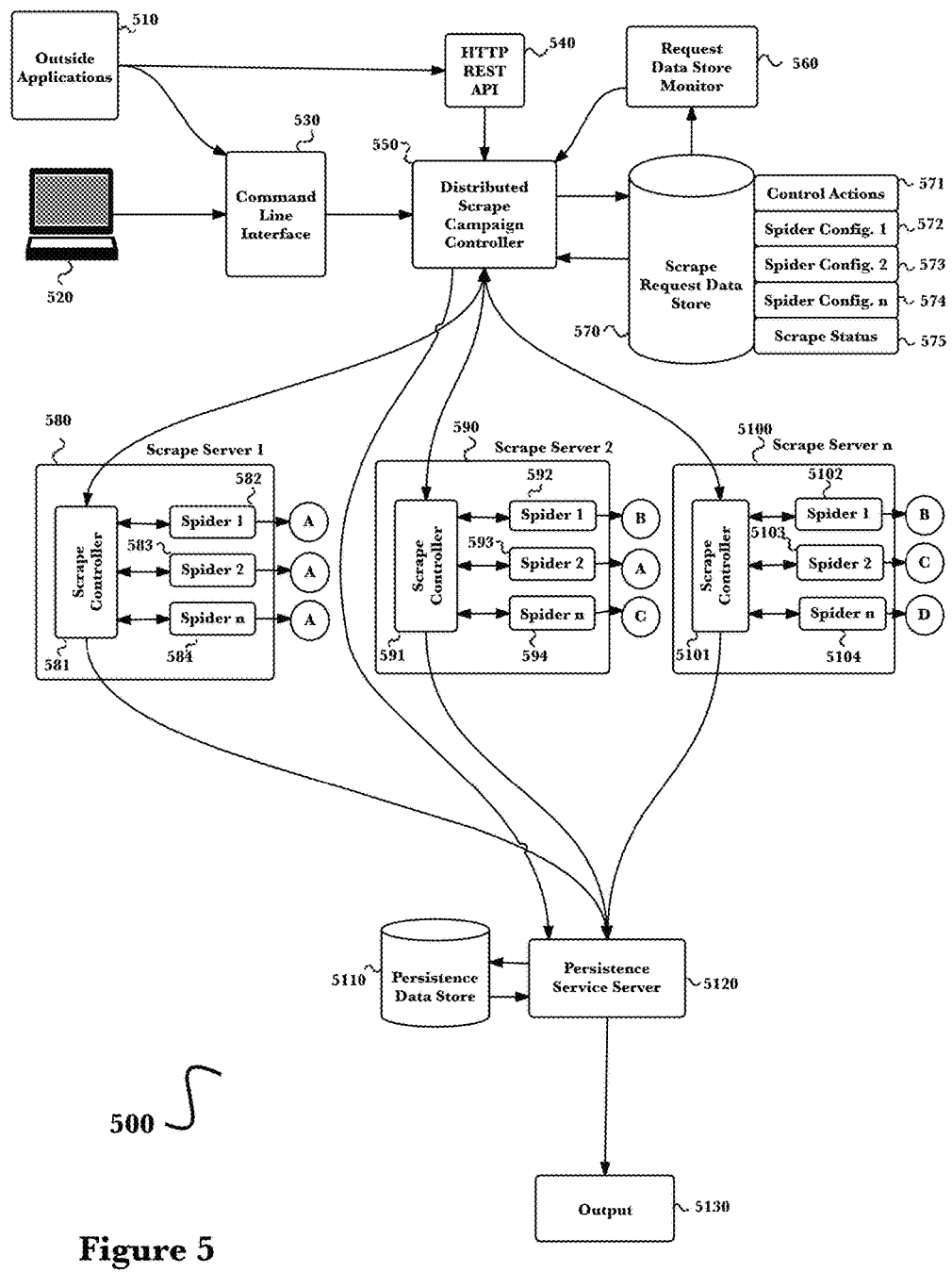

FIG. 4 is a block diagram illustrating an exemplary overview of a computer system as may be used in any of the various locations throughout the system FIG. 5 is a diagram of an exemplary architecture of a distributed system for rapid, large volume, search and retrieval of unstructured or loosely structured information found on sources such as the World Wide Web according to an embodiment of the invention.

Figure 6:
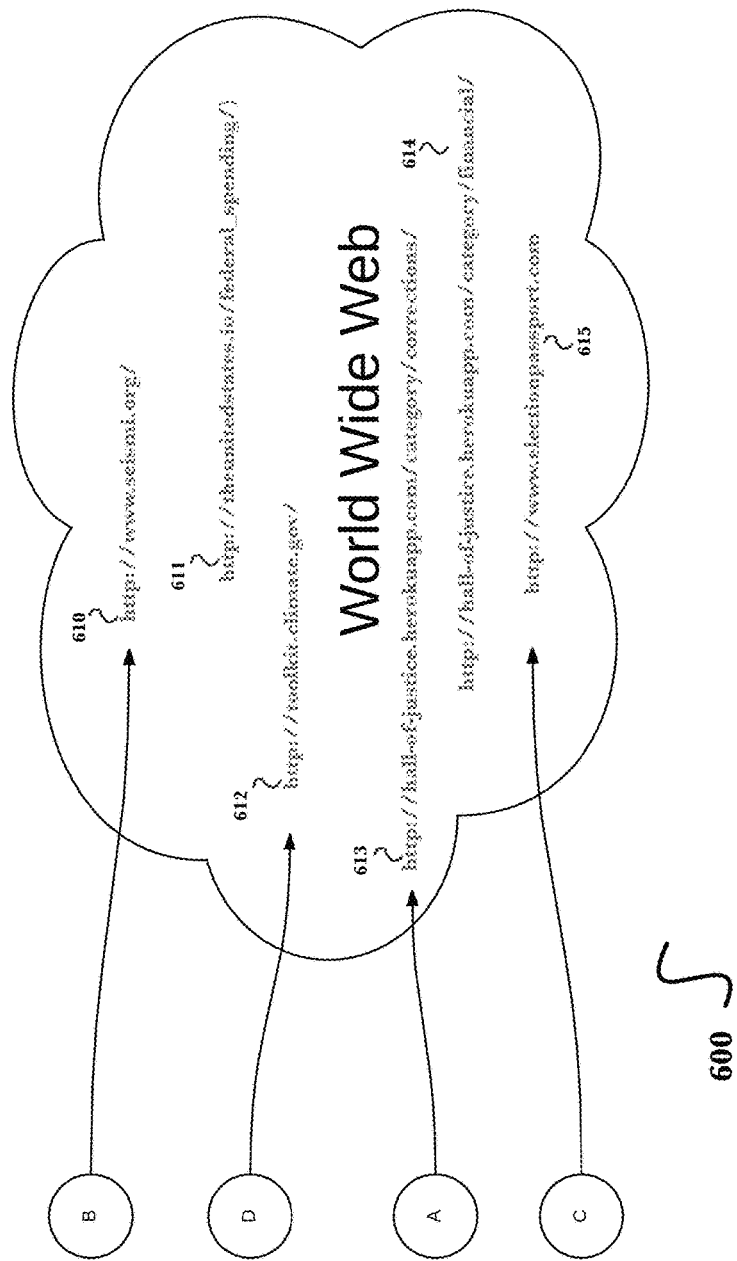

FIG. 6 is a diagram showing exemplary World Wide Web target sites containing the type of loosely structured, large volume, data that make them candidates for search and retrieval by the invention according to an embodiment of the invention.

Figure 7:
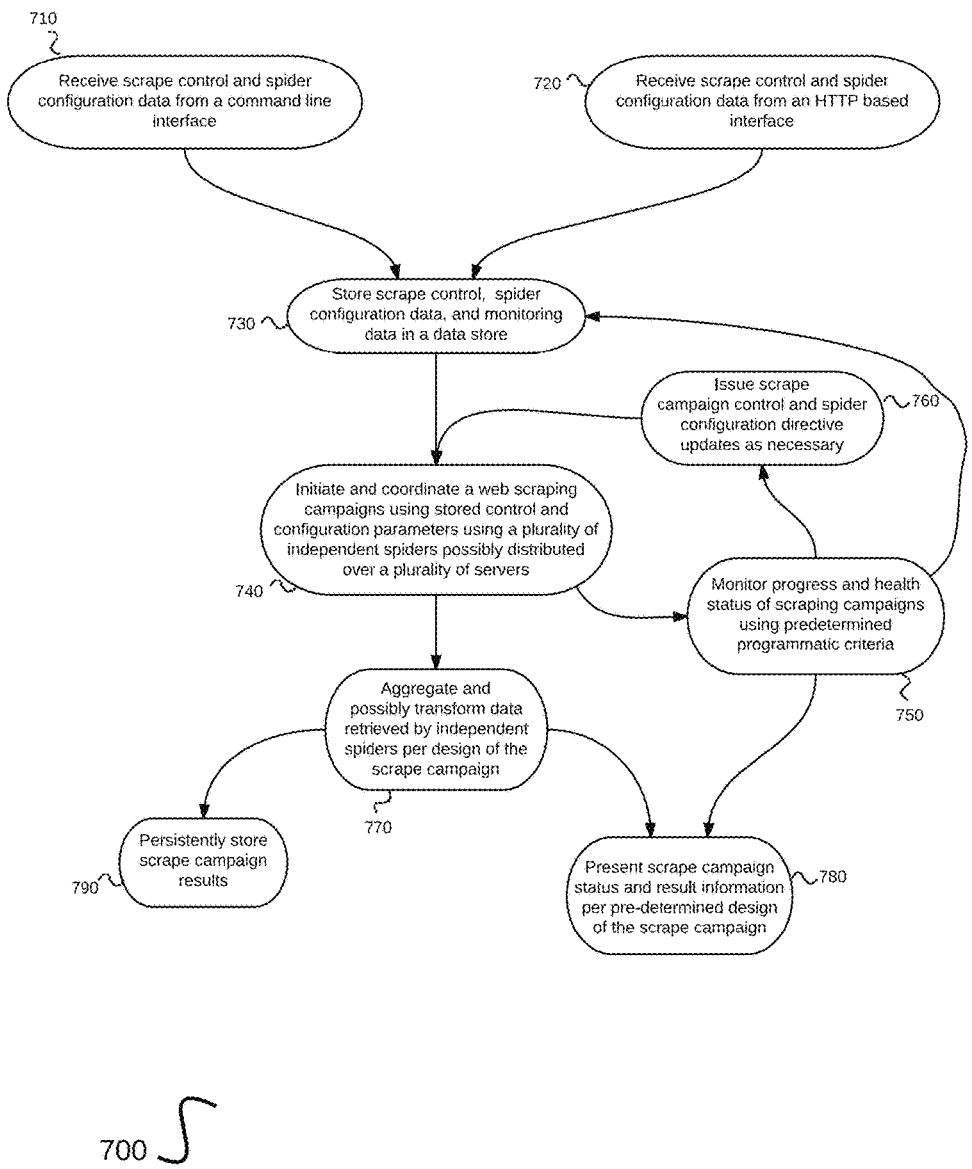

FIG. 7 is a process flow diagram of a method for the load of search agent configuration and search control directives, the coordination of a web scrape using those data and the presentation of the results according to an embodiment of the invention.

FIG. 8. is a method diagram showing an exemplary configuration of a spider as used according to an embodiment of the invention or HTTPS.

DETAILED DESCRIPTION

The inventor has conceived, and reduced to practice, various systems and methods for scraping data, at scale, from sites on the World Wide Web using distributed computing.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "scrape campaign" means the directed deployment of web crawling agents (spiders) programmed to traverse the World Wide Web to a specific site or plurality of sites and to retrieve specifically requested data, possibly in the absence of prototypical web tags. Herein, the web sites targeted are expected to contain very large caches of both textual and graphical, with minimal tagging, type data and to require the use of large numbers of spiders possibly from multiple servers to retrieve. The rules governing the retrieval of the information to be scraped from the targeted sites or pages are also expected to be complex in nature and to require significant preplanning to successfully and meaningfully retrieve. Significant post-retrieval processing of the data may also be needed to attain the goals of the authors of the endeavor.

A "database" or "data store" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, key-value databases, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using distributed technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system possibly networked with others in a data processing center, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
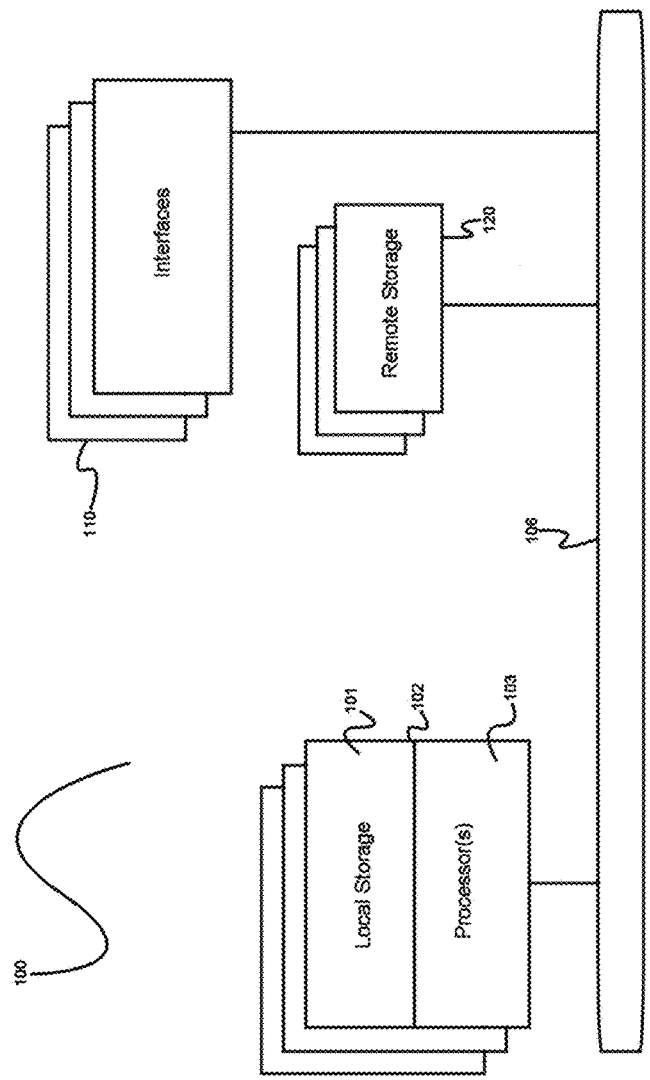
FIG. 1 is a block diagram illustrating an exemplary hardware architecture of a computing device used in various embodiments of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more buses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
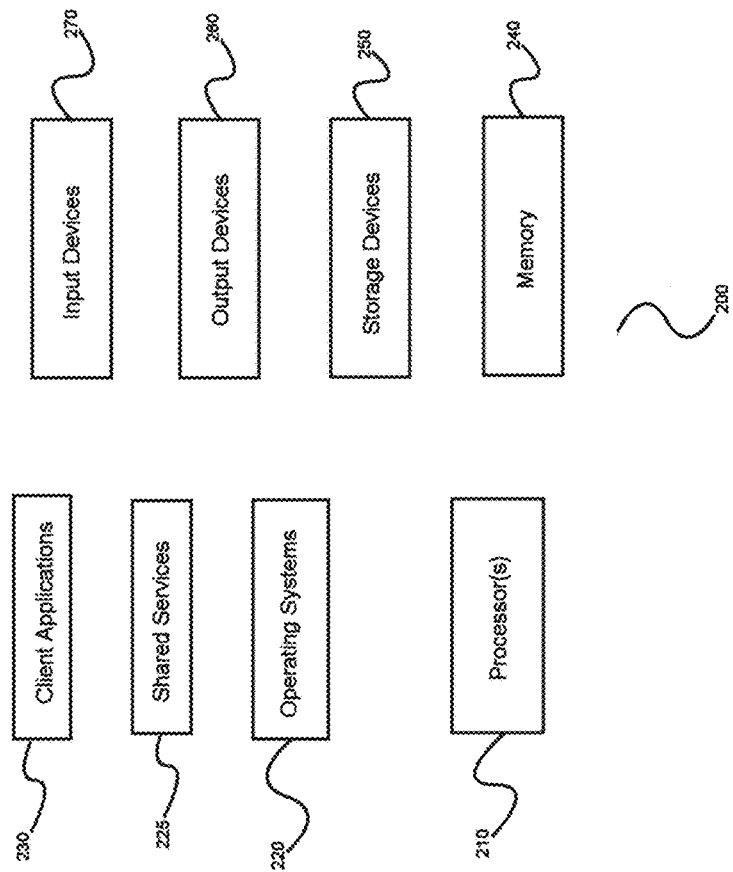
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
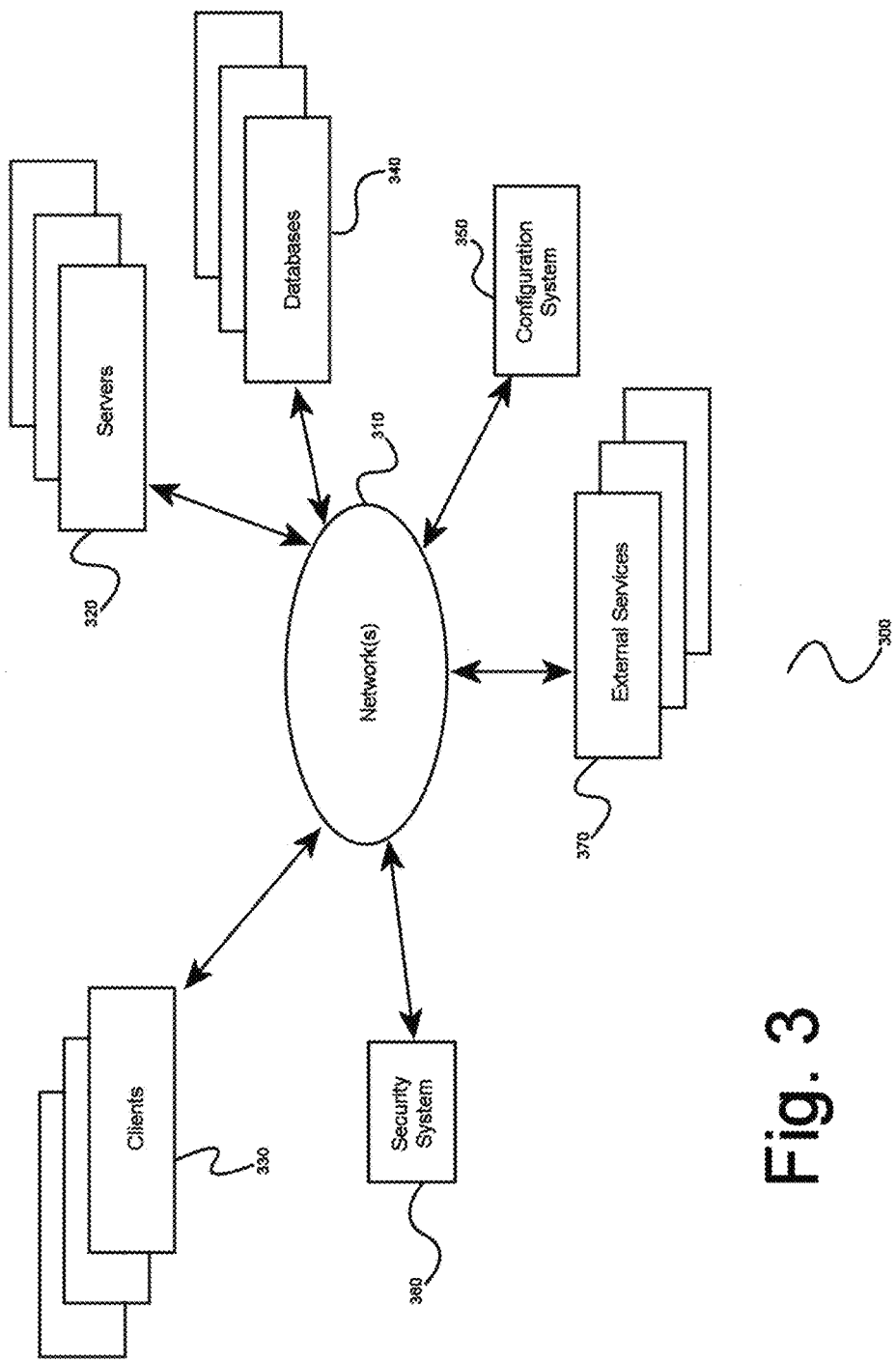
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, MongoDB, Redis and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 5 is a diagram of an exemplary architecture of a distributed system 500 for rapid, large volume, search and retrieval of unstructured or loosely structured information found on sources such as the World Wide Web, according to a preferred embodiment of the invention. According to the embodiment, scrape campaign requests, which are comprised of a plurality of scrape agent (spider) configuration parameters as well as scrape campaign control directives, may be entered from a connected computer terminal 520 or by terminal-like commands issued by external software applications 510 using a built in command line interface 530. Alternatively, similar scrape campaign requests may enter the system through an HTTP REST-based API using JSON-compliant instructions 540. Scrape campaign parameters enter a distributed scrape campaign controller module 550, where they are formalized and stored in a scrape request data store 570 as one or more scrape campaign-related spider configurations 572, 573, 574 and associated scrape campaign control directives 571. Scrape campaigns remain persistently stored until a command to run one or more of them is received through command line interface 530 or HTTP-based API 540, at which time request parameters 571, 572, etc. for a campaign are retrieved by distributed scrape campaign controller module 550 from scrape request data store 570. Persistent storage of scrape campaign request parameters also allows the same scrape campaign to be run multiple times and used as a starting point for design of similar scrape campaigns. Upon receipt of a command to run a specific scrape campaign and retrieval of that scrape campaign's configuration and control parameters, distributed scrape campaign controller module 550 coordinates the scrape campaign in regards to the number of spiders 582, 583, 584 to be used, and the number of distributed scrape servers 580, 590, 5100 to be used based upon the control directives for that campaign. Distributed scrape campaign controller module 550 then sends appropriate instructions to scrape servers 580, 590, 5100 to initiate and run the requested scrape campaign. If there are multiple spider configurations present in a scrape campaign request so as to cause the scraping of multiple web pages or sites 600, how many spiders to assign to each page and the priority each spider type has for scrape server resources is also coordinated by distributed scrape campaign controller module 550, which directs the scrape servers 580, 590, 5100 accordingly to initiate and run the requested multipage or multisite scrape campaign. Once the data to run a scrape campaign is sent to it, scrape controller module 581, 591, 5101 of each scrape server 580, 590, 5110 executes the required scrapes. Scrape controller module 580 590, 5110 hosts the programming for the spiders into which it loads scrape campaign spider configuration parameters sent to scrape server 580, 590, 5110 from distributed scrape campaign controller module 550 using the co-sent scrape campaign control directives to determine the number of spider instances 582, 583, 584 to create and the resource usage priority each spider is given on the server. It is possible that all spider 582, 583, 584 instances on a given scrape server 580 will be scraping the same web target 613; however, the invention does not require this and is instead set up to make efficient use of scrape server resources. Therefore, a single scrape server 590; 5110 may execute spiders scraping different web targets 592, 593, 594; 5102, 5103, 5104 and the spiders scraping a single web target 582, 583, 593; 592, 5102; 594, 5103 may be distributed across multiple servers 580; 590; 5100. Scrape controller module 581, 591, 5101 of each scrape server 580, 590, 5100 monitors the progress and operational status of the spiders it has executed and returns that information back to distributed scrape controller module 550. Both the progress and operational data is stored as log data 575 in scrape request store 570 and is made available to the authors of the scrape campaign during its operation, which may result in directives being issued that change one or more aspects of the scrape campaign. The invention is designed to allow such mid-campaign parameter changes without downtime or loss of collected, intermediate, data. Results of the scrapes returned to scrape controller module 581, 591, 5100 by individual spiders 582, 583, 584, 592, 593, 594, 5102, 5103, 5104 are sent to persistence service server 5120, which aggregates the data from individual scrape server spiders 582, 583, 584, 592, 593, 594, 5102, 5103, 5104, and performs any transformations pre-designed by the authors of the scrape campaign prior to outputting the data in a format determined by the authors of the campaign. This may involve sending the output to external software applications for further processing. The data may also be processed for storage by persistence service server 5120 and sent to a persistence data store for more permanent archival.

It is should be noted that, while the core distributed scrape campaign system distributes load across a pool of scrape servers, coordinates the number of spiders employed within a scrape campaign, and prioritizes allotment of scrape server resources among spiders, it does not internally manage or control spider web page and link follow restrictions, crawling frequencies, and so forth. Individual spiders must implement suitable controls and crawling orchestration (which is external to the distributed scrape campaign system). All of these considerations are part of the scrape campaign spider configuration parameters that are received from the authors of scrape campaigns 510, 520 by distributed scrape campaign controller module 550. This is done to give the authors of the scrape maximal flexibility in the behavior of the spiders during a scrape campaign while allowing the use of a robust yet easily deployed spider programming interface 800.

FIG. 6 is a block diagram 600 of websites on the World Wide Web that are example target types of a distributed system for large volume extraction of deep web data. Www.seismi.org 610, for example, is a website of seismic data that by nature is non-textual and therefore has very few tags that might be useful to conventional web crawlers. Data retrieved from this type of web site also does not fit well into a relational data store setting and might require extensive post-scrape transformation before storage in a document type data store. As another example, theunitedstates.io/federal_spending/ 611 is a web site that publishes raw spending data reports that are largely textual, but has extremely few, if any, web related tags and is thus poorly indexed or retrieved by conventional scraping. This type of web site also is expected to have a very large volume of data, which again serves to thwart conventional web crawling tools. Further, the raw spending data might require significant pre-processing prior to meaningful data store storage. Similarly, toolkit.climate.gov 612, like www.seismi.org 610, is a site that would be expected to have large amounts of non-textual climate data that needs to be processed with few if any web related tags meaning that climate intrinsic keywords would need to be employed for meaningful retrieval of the scraped data and, again both data transformation steps and pre-storage processing may be needed prior to meaningful storage. Moreover, http://hall-of-justice.herokuapp.com/category/corrections/ 613, http://hall-of-justice.herokuapp.com/category/financial/ 614, and http://www.electionpassport.com 615 are all similar in that they are sites with extremely large volumes of free-form textual data with few if any web tags and with a high probability that data retrieved will need to be processed prior to output or storage.

DESCRIPTION OF METHOD EMBODIMENTS

FIG. 7 is a process flow diagram of a method 700 for a distributed system for large volume deep web data extraction 500. Parameters for one or more scrape campaigns, which include, but may not be limited to; scrape agent (spider) 582, 583, 584, 592, 593, 594, 5102, 5103, 5104, configuration data which may be comprised of, but is not limited to; web sites or web pages to be traversed, keywords or tags for web document data to be parsed, and search expansion rules for following links or other references found on the sites scraped, as well as any other spider configuration information included by the authors of the scrape campaign; and scrape campaign control directives—which may include but would not be limited to: the number of spiders to be used in the campaign, relative resource usage priorities for specific web sites or pages within the intended scrape campaigns, directives for adjustments to be made to the scrape campaign upon the encounter of specific results or types of results, directives for application of specific scrape campaign result data pre-processing and post-processing steps and output format directives including persistent storage formalization rules—are received through either a command line interface 710, 530 that may receive commands either from an interactive terminal 520 or another software application on a computing system 510 or from software applications 510 through a HTTP-based RESTful JSON application programming interface (API) 720, 540. The use of REST and JSON within API 720, 540 should not be construed to mean that the invention is dependent on use of only those protocols for this task, as one knowledgeable in the art will realize that any similar protocols such as, but not limited to, SOAP or AJAX could also be employed according to the invention. The use of REST and JSON is only in accordance with current practice and inventor decision. Scrape campaign control and spider configuration parameters received are formalized, as necessary and stored in data store for future use when the scrape campaign is initiated. In initiation may be immediate or delayed and the same scrape campaign may be repeatedly run as parameters persist until purged. One knowledgeable in the art will comprehend that key-value data stores such as Redis are very well suited for storage of scrape campaign parameter data, however, the invention does not dictate the use of any specific type of data store for scrape campaign data. Once the command to initiate a scrape campaign 740 is received, the invention uses the control directives passed to it by the scrape campaign authors to coordinate scrape campaign 740. Directives from a list comprising the number and complexity of the web sites to be scraped, the priorities assigned to specific web sites or pages, the number different spider configurations to be employed, the speed the author desires the scrape to progress among other factors are used to determine the number of spiders that will be deployed and the number of scrape servers to be included in the scrape as per predetermined programming within the invention. While the scrape is active, progress and operational information such as stuck spiders and intermediate scrape results is continuously monitored 750 by the scrape campaign controller module 550 through the scrape controllers 581, 591, 5101 such that the authors of the scrape campaign can determine the progress made in the scrape, have some indication of what results have been produced, know what tasks the spiders still have pending as well as any links that may have been followed and the impact on the scrape as a whole of those additions as per pre-programmed reporting parameters 780. Monitoring 750 and reporting 780 are useful to make users aware of operational issues that have arisen, if any. Monitoring data is logged to a data store 730 for future analysis. Program design of the invention allows for adjustments to scrape campaign 740 be made, either due to the just disclosed progress and operational health reports, or other unforeseen factors, without having to shut down the running scrape and without loss of previously accrued scrape results 760. Raw scrape results obtained by the individual spiders are passed through scrape controller modules 581, 591, 5101 of scrape servers 580, 590, 5100 and are aggregated and then possibly transformed in specific ways depending on the predetermined goals of scrape campaign 770. The invention offers pre-programmed algorithm toolsets for this purpose and also offers API hooks that allow the data to be passed to external processing algorithms prior to final output in a format pre-decided to be most appropriate for the needs of the scrape campaign authors. Result data may also be appropriately processed and formalized for persistent storage in a document based data store 790 such as MongoDB, although, depending on the needs of the authors and the type of data retrieved during the scrape, any NOSQL type data storage or even a relational database may be used. The invention has no dependency for any particular data store type for persistent storage of scrape results.

FIG. 8 is a listing of a very simple example web spider configuration file 800. This listing requires that the Scrapy framework (used for exemplary purposes only, and not limiting)—as well as libraries on which Scrapy depends (http://doc.scrapy.org/en/1.0/intro/install.html)—be present on the system running the web scrape. While highly simplified, listing 800 shows major sections needed to create a scrape-specific spider 810, 820, 830, 840. At the top of listing 810 is found a section that declares the portions of the Scrapy framework that are to be included in the creation of the current spider. Going down the listing, section 820 declares a name to be used to identify this spider type as well as the World Wide Web domains the spider is allowed to traverse during the scrape, as well as the URL of the starting point of the scrape. In section 830 are any rules to apply when encountering HTML links during a scrape, and also what algorithms should be used when processing target information of the scrape, in this case the spider is scraping specific types of HTML links from the example.com domain. The last section 840 provides instructions on how to process target data, including instructions for data associated to specific web tags. While the spider created by this sample configuration would have limited capability, it is functional and would, as written, complete its scrape. One will immediately appreciate that all of the directives in the listed spider definition have to do with retrieving data and are not concerned with the minutia of how the spider gets to the web site or implements the instructions given in the listed file, and so forth.

The skilled person will be aware of a range of possible modifications of the various embodiments described above. Accordingly, the present invention is defined by the claims and their equivalents.

What is claimed is:

1. A distributed system for large volume deep web data extraction comprising:
    a distributed scrape campaign controller module stored in a memory of and operating on a processor of a computing device;
    a scrape request data store stored in a memory of and operating on a processor of a computing device;
    a scrape request monitor module stored in a memory of and operating on a processor of a computing device;
    one or more scrape servers stored in a memory of and operating on a processor of one of more computing devices;
    a persistence service module stored in a memory of and operating on a processor of a computing device;
    a persistence data store stored in a memory of and operating on a processor of a computing device; and
    an output module stored in a memory of and operating on a processor of a computing device;
    wherein the distributed scrape campaign controller module:
        (a) receives scrape control and spider configuration parameters from a plurality of software applications through an HTTP based API;
        (b) receives scrape control and spider configuration parameters from either a computer terminal or a plurality of software applications through a command line interface;
        (c) uses the scrape request data store to store both generalized search control parameters and configuration parameters specific to individual web search agents (spiders) derived from the HTTP based API and command line interface directives;
        (d) coordinates one or more World Wide Web searches (scrapes) using both general search control parameters and spider specific configuration data;
        (e) receives scrape progress feedback information from the request data store monitor module, and based on at least a portion of the received scrape progress feedback information issues further web search control parameters; and
    wherein the scrape request data store:
        (f) receives World Wide Web search control parameters and spider specific configuration information from the distributed scrape campaign controller;
        (g) stores scrape control parameters, spider configuration parameters, scrape status data; and
    wherein the scrape request monitor module:
        (h) monitors the scrape status data stored for each ongoing search in the scrape request data store;
        (i) processes the scrape status data as programmatically pre-determined for the search monitored;
        (j) sends at least a portion of the processed scrape status data to the distributed scrape campaign controller module; and
    wherein at least one of the one or more scrape servers:
        (k) hosts a plurality of individual web search agents (spiders);
        (l) receives scrape specific control directives and spider configuration parameters from the distributed scrape campaign controller module;
        (m) controls and monitors a plurality of independent spiders on the server;
        (n) returns scrape status data from at least one of the plurality of independent spiders deployed from the server to the distributed scrape campaign controller and scrape request data store;
        (o) sends web page data retrieved by the independent spiders to the persistence service module for storage or output; and
    wherein the persistence server module:
        (p) receives scrape campaign data from at least one of the one or more scrape servers;
        (q) aggregates the scrape campaign data;
        (r) performs pre-requested scrape campaign data transformations prior to providing the scrape campaign data for storage or output; and
    wherein the output module:
        (s) produces results in a format pre-determined by the owners of a scrape campaign.

2. The system of claim 1 wherein a plurality of archetype spiders are provided by a program library and individual spiders are created using configuration files.

3. The system of claim 1 where scrape campaign requests are persistently stored and can be reused or used as the basis for additional scrape campaigns.

* * * * *